US012127061B2

United States Patent
Panchal et al.

(10) Patent No.: US 12,127,061 B2
(45) Date of Patent: Oct. 22, 2024

(54) METHOD AND SYSTEM FOR END DEVICE NETWORK SLICE SELECTION

(71) Applicant: Verizon Patent and Licensing Inc., Basking Ridge, NJ (US)

(72) Inventors: Jignesh S. Panchal, Hillsborough, NJ (US); Deepa Jagannatha, Bridgewater, NJ (US); Sudhakar Reddy Patil, Flower Mound, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 271 days.

(21) Appl. No.: 17/545,018

(22) Filed: Dec. 8, 2021

(65) Prior Publication Data

US 2023/0180082 A1    Jun. 8, 2023

(51) Int. Cl.
| | | |
|---|---|---|
| H04W 4/00 | (2018.01) | |
| H04W 36/00 | (2009.01) | |
| H04W 36/08 | (2009.01) | |
| H04W 76/19 | (2018.01) | |
| H04W 76/30 | (2018.01) | |

(52) U.S. Cl.
CPC ....... *H04W 36/08* (2013.01); *H04W 36/0033* (2013.01); *H04W 76/19* (2018.02); *H04W 76/30* (2018.02)

(58) Field of Classification Search
CPC . H04W 36/08; H04W 36/0033; H04W 76/19; H04W 76/30; H04W 76/32; H04W 76/12; H04W 36/0011; H04W 48/18
See application file for complete search history.

(56) References Cited

U.S. PATENT DOCUMENTS

| | | | | |
|---|---|---|---|---|
| 2020/0059989 | A1* | 2/2020 | Velev | H04W 8/08 |
| 2020/0137639 | A1* | 4/2020 | Yuan | H04W 36/0011 |
| 2021/0258718 | A1* | 8/2021 | Kim | H04W 60/02 |
| 2022/0264295 | A1* | 8/2022 | Tamura | H04W 76/32 |
| 2022/0369404 | A1* | 11/2022 | Gundavelli | H04W 40/20 |
| 2023/0052699 | A1* | 2/2023 | Ninglekhu | H04W 60/04 |
| 2023/0247685 | A1* | 8/2023 | Choe | H04W 76/10 |
| | | | | 370/329 |
| 2023/0319514 | A1* | 10/2023 | Kim | H04W 4/08 |
| | | | | 370/312 |
| 2024/0073996 | A1* | 2/2024 | Chun | H04W 24/02 |

* cited by examiner

*Primary Examiner* — Edan Orgad
*Assistant Examiner* — Hidayat Dabiri

(57) ABSTRACT

A method, a device, and a non-transitory storage medium are described in which a network slice selection service is provided. The service may include using route selection policies that includes radio frequency criteria for selection of a network slice. The service may include establishing an application session based on the route selection policies. The service may further include determining that a radio frequency of the network slice cannot be sustained. The service may include executing an application session release procedure and an application session establishment procedure. The procedures may include using cause data and context data pertaining to the initial application session to re-establish the application session via a different network slice and a different radio frequency based on the route selection policies.

20 Claims, 11 Drawing Sheets

METHOD AND SYSTEM FOR END DEVICE NETWORK SLICE SELECTION

BACKGROUND

Development and design of networks present certain challenges from a network-side perspective and an end device perspective. For example, Next Generation (NG) wireless networks, such as Fifth Generation New Radio (5G NR) networks are being deployed and under development.

DETAILED DESCRIPTION

Figure 1:
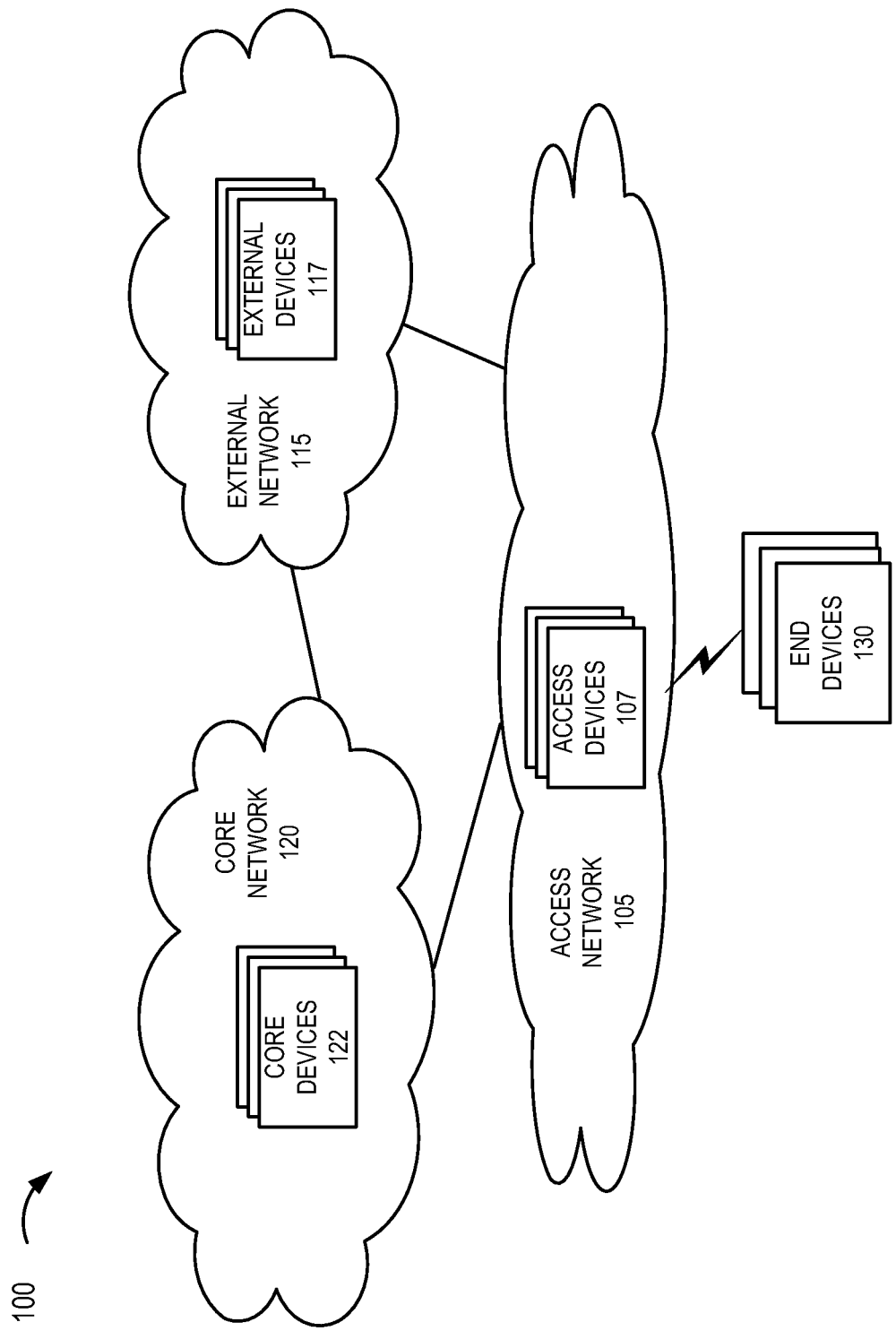
FIG. 1 is a diagram illustrating an exemplary environment in which an exemplary embodiment of a network slice selection service may be implemented.

The following detailed description refers to the accompanying drawings. The same reference numbers in different drawings may identify the same or similar elements. Also, the following detailed description does not limit the invention.

End devices, such as user equipment (UEs), may use various radio frequencies (RFs), radio bands, carriers, and/or radio spectrum (referred to herein simply as RF(s)) to obtain various application services. Depending on the location of an end device, for example, a radio access network (RAN) may not offer the same RF (e.g., millimeter (mm) wave, mid-band, C band, low band, and/or another segment of RF) and/or an amount of radio resources to the end device. As a result, the end device may suffer differing connectivity and quality of service. For example, the end device may connect to an application service via a network slice 1, which is available in certain geographic areas and supported by a first RF. However, thereafter the end device may move during the application session to a geographic area that does not support network slice 1 and the associated first RF, and the end device may continue to stay connected to network slice 1 which results in gradual degradation of the application service and eventual end-to-end connection loss.

According to exemplary embodiments, a network slice selection service is provided. According to an exemplary embodiment, an end device may provide the network slice selection service, as described herein. According to an exemplary embodiment, the network slice selection service may include policies or rules that may configure the end device regarding network slice selection. For example, the polices or rules may be implemented as UE Route Selection Policy (URSP) rules. According to another example, the policies or rules may be implemented as device management or configuration information. According to an exemplary embodiment, the policies or rules may enable the end device to determine how an application may be managed depending on the context of a new or existing application or protocol data unit (PDU) session.

According to an exemplary embodiment, the policies or rules may include criteria and/or descriptors upon which the end device may select a network slice. For example, the criteria or the descriptors may include RF data, location data, time data, and/or another configurable parameter, as described herein. According to exemplary embodiment, the policies or rules may include a priority of network slices, as described herein. For example, the end device may select a network slice based on the available RF for the end device and associated policy or rule. The policies or rules may be associated with precedence or priority values. The criteria or descriptors may be associated with precedence or priority values.

During an application or PDU session, the end device may move to a locale which does not permit the end device to remain on the selected network slice and/or the network slice is no longer available at the new location. According to an exemplary embodiment, the network slice selection service may terminate or modify the application or PDU session based on the policies or rules, as described herein. For example, the end device may determine the available RF and select another network slice based on the RF and other criteria and/or descriptors, as described herein. According to an exemplary embodiment, the network slice selection service may provide that the end device establishes a new application and/or PDU session automatically via the other network slice and route all packets via the other network slice. The end device may provide context information about the previous application/PDU session to the network so that the network may recover the application/PDU session state associated with the previous network slice, as described herein. For example, the context information may include cause data indicative of a reason for the change of network slice. According to an exemplary embodiment, the network slice selection service may provide that the network selects the same core network devices used to support the initial network slice to support the new network slice. According to various exemplary embodiments of the network slice selection service, the end device and the network may create an equivalent PDU context between the initial network slice and the new network slice in a "break and make" mode or a in a "make before break" mode, for example.

In view of the foregoing, the network slice selection service may enable the end device to select networks slices based on RF data and other criteria. In this way, application service session continuity and performance metrics may be ensured. The network slice selection service may minimize a delay in reestablishing an application service session by the end device due to remaining on a network slice that is likely to result in an end-to-end connection loss. The network slice selection service may enable PDU context information associated with a network slice and application/PDU session to be used in various ways, as described herein, that supports the provisioning of a new slice.

FIG. 1 is a diagram illustrating an exemplary environment 100 in which an exemplary embodiment of network slice selection service may be implemented. As illustrated, environment 100 includes an access network 105, an external network 115, and a core network 120. Access network 105 includes access devices 107 (also referred to individually or generally as access device 107). External network 115 includes external devices 117 (also referred to individually or generally as external device 117). Core network 120 includes core devices 122 (also referred to individually or generally as core device 122). Environment 100 further includes end devices 130 (also referred to individually or generally as end device 130).

The number, type, and arrangement of networks illustrated in environment 100 are exemplary. For example, according to other exemplary embodiments, environment 100 may include fewer networks, additional networks, and/or different networks. For example, according to other exemplary embodiments, other networks not illustrated in FIG. 1 may be included, such as an X-haul network (e.g., backhaul, mid-haul, fronthaul, etc.), a transport network (e.g., Signaling System No. 7 (SS7), etc.), or another type of network that may support a wireless service and/or an application service, as described herein.

A network device, a network element, or a network function (referred to herein simply as a network device) may be implemented according to one or multiple network architectures, such as a client device, a server device, a peer device, a proxy device, a cloud device, and/or a virtualized network device. Additionally, a network device may be implemented according to various computing architectures, such as centralized, distributed, cloud (e.g., elastic, public, private, etc.), edge, fog, and/or another type of computing architecture, and may be incorporated into various types of network architectures (e.g., Software Defined Networking (SDN), virtual, logical, network slice, etc.). The number, the type, and the arrangement of network devices, and the number of end devices 130 are exemplary. For purposes of description, end device 130 is not considered a network device.

Environment 100 includes communication links between the networks, between the network devices, and between end devices 130 and the network/network devices. Environment 100 may be implemented to include wired, optical, and/or wireless communication links. A communicative connection via a communication link may be direct or indirect. For example, an indirect communicative connection may involve an intermediary device and/or an intermediary network not illustrated in FIG. 1. A direct communicative connection may not involve an intermediary device and/or an intermediary network. The number, type, and arrangement of communication links illustrated in environment 100 are exemplary.

Environment 100 may include various planes of communication including, for example, a control plane, a user plane, a service plane, and/or a network management plane. Environment 100 may include other types of planes of communication. According to various exemplary implementations, the interface of the network device may be a service-based interface, a reference point-based interface, an Open Radio Access Network (O-RAN) interface, a 5G interface, another generation of interface (e.g., 5.5G, 6G, 7G, etc.), or some other type of interface.

Access network 105 may include one or multiple networks of one or multiple types and technologies. For example, access network 105 may be implemented to include a 5G RAN, a future generation RAN (e.g., a sixth generation (6G) RAN, a seventh generation (7G) RAN, or a subsequent generation RAN), a centralized-RAN (C-RAN), and/or another type of access network. Access network 105 may include a legacy RAN (e.g., a third generation (3G) RAN, a 4G or 4.5 RAN, etc.). Access network 105 may communicate with and/or include other types of access networks, such as, for example, a WiFi network, a Worldwide Interoperability for Microwave Access (WiMAX) network, a local area network (LAN), a Citizens Broadband Radio System (CBRS) network, a cloud RAN, an O-RAN network, a virtualized RAN (vRAN), a self-organizing network (SON), a wired network (e.g., optical, cable, etc.), or another type of network that provides access to or can be used as an on-ramp to access network 105, external network 115, and/or core network 120.

Access network 105 may include different and multiple functional splitting, such as options 1, 2, 3, 4, 5, 6, 7, or 8 that relate to combinations of access network 105 and a core network including, for example, an evolved packet core (EPC) network and/or an 5G core network, or the splitting of the various layers (e.g., physical layer, medium access control (MAC) layer, radio link control (RLC) layer, packet data convergence protocol (PDCP) layer, and/or other layers), plane splitting (e.g., user plane, control plane, etc.), a centralized unit (CU) and distributed unit (DU), interface splitting (e.g., F1-U, F1-C, E1, Xn-C, Xn-U, X2-C, Common Public Radio Interface (CPRI), etc.) as well as other types of network services, such as dual connectivity (DC) or higher, carrier aggregation (CA), edge and core network slicing, coordinated multipoint (CoMP), various duplex schemes, and/or another type of connectivity service (e.g., non-standalone (NSA) new radio (NR), stand-alone (SA) NR, and the like).

Depending on the implementation, access network 105 may include one or multiple types of network devices, such as access devices 107. For example, access device 107 may include a next generation Node B (gNB), an evolved LTE (eLTE) evolved Node B (eNB), an eNB, a radio network controller (RNC), a remote radio head (RRH), a baseband unit (BBU), a radio unit (RU), a centralized unit (CU), a CU control plane (CU CP), a CU user plane (CU UP), a distributed unit (DU), a small cell node (e.g., a picocell device, a femtocell device, a microcell device, a home eNB, etc.), an open network device (e.g., O-RAN Centralized Unit (O-CU), O-RAN Distributed Unit (O-DU), O-RAN next generation Node B (O-gNB), O-RAN evolved Node B (O-eNB)), a 5G ultra-wide band (UWB) node, a future generation wireless access device (e.g., a 6G wireless station, a 7G wireless station, or another generation of wireless station), another type of wireless node (e.g., a WiFi device, a WiMax device, a hotspot device, etc.) that provides a wireless access service, or another type of network device that provides a transport service (e.g., routing and forwarding), such as a router, a switch, or another type of layer 3 (e.g., network layer of the Open Systems Interconnection (OSI) model) network device. Additionally, or alternatively, access device 107 may include a wired and/or optical device (e.g., modem, wired access point, optical access point, Ethernet device, etc.) that provides network access.

External network 115 may include one or multiple networks of one or multiple types and technologies that provides an application service. For example, external network 115 may be implemented using one or multiple technologies including, for example, network function virtualization (NFV), SDN, cloud computing, Infrastructure-as-a-Service (IaaS), Platform-as-a-Service (PaaS), Software-as-a-Service (SaaS), or another type of network technology. External network 115 may be implemented to include a cloud network, a private network, a public network, a MEC network, a fog network, the Internet, a packet data network (PDN), a service provider network, the World Wide Web (WWW), an Internet Protocol Multimedia Subsystem (IMS) network, a Rich Communication Service (RCS) network, an SD network, a virtual network, a packet-switched network, a data center, or other type of network that may provide access to and may host an end device application service.

Depending on the implementation, external network 115 may include various network devices such as external devices 117. For example, external devices 117 may include virtual network devices (e.g., virtualized network functions (VNFs), servers, host devices, containers, hypervisors, virtual machines (VMs), network function virtualization infrastructure (NFVI), and/or other types of virtualization elements, layers, hardware resources, operating systems, engines, etc.) that may be associated with application services for use by end devices 130. By way of further example, external devices 117 may include mass storage devices, data center devices, NFV devices, SDN devices, cloud computing devices, platforms, and other types of network devices pertaining to various network-related functions (e.g., security, management, charging, billing, authentication, authorization, policy enforcement, development, etc.). External network 115 may include one or multiple types of core devices 122, as described herein.

External devices 117 may host one or multiple types of application services. For example, the application services may pertain to broadband services in dense areas (e.g., pervasive video, smart office, operator cloud services, video/photo sharing, etc.), broadband access everywhere (e.g., 50/100 Mbps, ultra-low-cost network, etc.), higher user mobility (e.g., high speed train, remote computing, moving hot spots, etc.), IoTs (e.g., smart wearables, sensors, mobile video surveillance, smart cities, connected home, etc.), extreme real-time communications (e.g., tactile Internet, augmented reality (AR), virtual reality (VR), etc.), lifeline communications (e.g., natural disaster, emergency response, etc.), ultra-reliable communications (e.g., automated traffic control and driving, collaborative robots, health-related services (e.g., monitoring, remote surgery, etc.), drone delivery, public safety, etc.), broadcast-like services, communication services (e.g., email, text (e.g., Short Messaging Service (SMS), Multimedia Messaging Service (MMS), etc.), voice, conferencing, instant messaging), video streaming, and/or other types of wireless and/or wired application services. External devices 117 may also include other types of network devices that support the operation of external network 115 and the provisioning of application services, such as an orchestrator, an edge manager, an operations support system (OSS), a local domain name system (DNS), registries, and/or external devices 117 that may pertain to various network-related functions (e.g., security, management, charging, billing, authentication, authorization, policy enforcement, development, etc.). External devices 117 may include non-virtual, logical, and/or physical network devices.

Core network 120 may include one or multiple networks of one or multiple network types and technologies. Core network 120 may include a complementary network of access network 105. For example, core network 120 may be implemented to include a 5G core network, an EPC of an LTE network, an LTE-Advanced (LTE-A) network, and/or an LTE-A Pro network, a future generation core network (e.g., a 5.5G, a 6G, a 7G, or another generation of core network), and/or another type of core network.

Depending on the implementation of core network 120, core network 120 may include various types of network devices that are illustrated in FIG. 1 as core devices 122. For example, core devices 122 may include a user plane function (UPF), a Non-3GPP Interworking Function (N3IWF), an access and mobility management function (AMF), an SMF, a unified data management (UDM) device, a unified data repository (UDR), an authentication server function (AUSF), a network slice selection function (NSSF), a network repository function (NRF), a policy control function (PCF), a binding support function (BSF), a network data analytics function (NWDAF), a network exposure function (NEF), a lifecycle management (LCM) device, an application function (AF), a mobility management entity (MME), a packet gateway (PGW), an enhanced packet data gateway (ePDG), a serving gateway (SGW), a home agent (HA), a General Packet Radio Service (GPRS) support node (GGSN), a home subscriber server (HSS), an authentication, authorization, and accounting (AAA) server, a policy and charging rules function (PCRF), a policy and charging enforcement function (PCEF), and/or a charging system (CS).

End devices 130 include a device that may have computational and/or communication capabilities (e.g., wireless, wired, optical, etc.). End device 130 may be implemented as a mobile device, a portable device, a stationary device (e.g., a non-mobile device and/or a non-portable device), a device operated by a user, or a device not operated by a user. For example, end device 130 may be implemented as a smartphone, a mobile phone, a personal digital assistant, a tablet, a netbook, a phablet, a wearable device (e.g., a watch, glasses, etc.), a computer, a gaming device, a music device, an IoT device, a drone, a smart device, or other type of wireless device (e.g., other type of user equipment (UE)). End device 130 may be configured to execute various types of software (e.g., applications, programs, etc.). The number and the types of software may vary among end devices 130. End devices 130 may include "edge-aware" and/or "edge-unaware" application service clients. For purposes of description, end device 130 is not considered a network device.

End device 130 may support one or multiple RATs (e.g., 4G, 5G, and/or future generation RAT) and various portions of the radio spectrum (e.g., multiple RF bands, multiple carrier frequencies, licensed, unlicensed, mm wave, above mm wave, cm wave, etc.), various levels and genres of network slicing, DC service, CA service, and/or other types of connectivity services. Additionally, end device 130 may include one or multiple communication interfaces that provide one or multiple (e.g., simultaneous, interleaved, etc.) connections via the same or different RATs, frequency bands, carrier frequencies, network slices, and/or via another communication medium (e.g., wired, etc.). The multimode capabilities of end device 130 may vary among end devices 130.

According to an exemplary embodiment, end device 130 includes logic that provides the network slice selection service, as described herein. According to an exemplary embodiment, end device 130 may store network slice selection service information, as described herein. According to an exemplary embodiment, the network slice selection service information may be pre-configured on end device 130. According to another exemplary embodiment, the network slice selection service information may be updated and/or provisioned by the network (e.g., PCF via an AMF). According to an exemplary embodiment, end device 130 may select a network slice based on the network slice selection service information. The logic of end device 130, which provides the network slice selection service, may analyze and identify the appropriate policy or rule to apply or use at a given instance.

FIGS. 2A-2F are diagrams illustrating an exemplary process 200 of an exemplary embodiment of the network slice selection service. Process 200 may be performed in an exemplary environment that includes an access device 107, such as a gNB 210-1 and gNB 210-2, of an access network 105, and external devices 117, such as application server 220-1 and application server 220-2, of external networks 115, such as MEC network 215-1 and MEC network 215-2, core network 120, and an end device 130, such as UE 205. According to other exemplary embodiments, the exemplary environment may include a different type of access device 107, a different type of external network 115, a different type of external device 117, and/or a different type of end device 130. According to an exemplary embodiment, network slice selection service logic may perform a step of process 200.

Figure 2A:
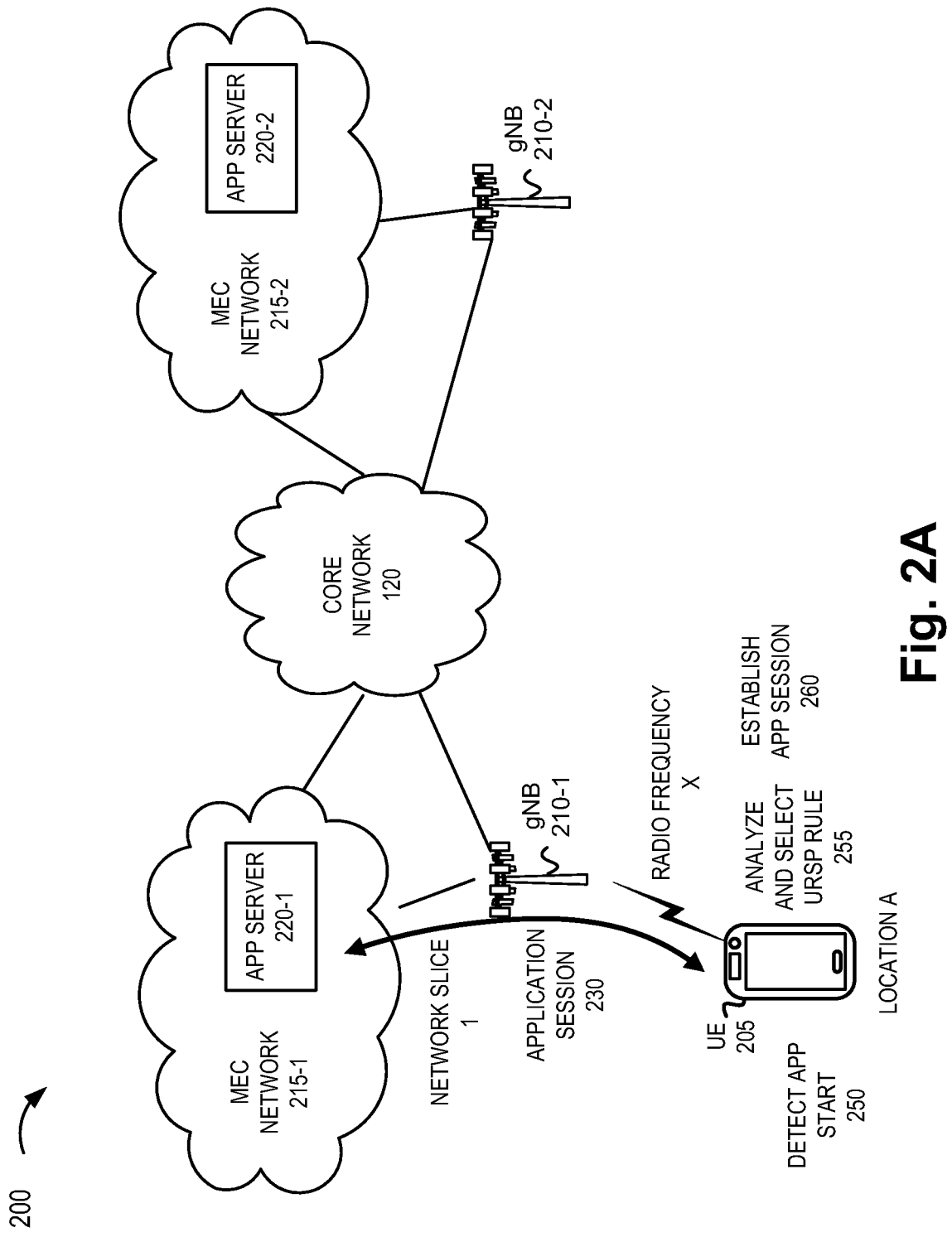
FIGS. 2A-2F are diagrams illustrating an exemplary process of an exemplary embodiment of the network slice selection service.

Referring to FIG. 2A, according to an exemplary scenario, assume UE 205 is located in a Location A and may be attached to gNB 210-1 (and registered with core network 120 via a Radio Frequency X (e.g., 66-71 GHz or another RF). UE 205 may detect the start of an application 250. For example, the application may be an extreme real-time communication or another type of application service. The logic of the network slice selection service (NSSS) of UE 205 may detect the start of the application and in response provide an NSSS process. For example, UE 205 may analyze and select a URSP rule 255. As a part of the NSSS process, the NSSS logic may include determining the RF to connect to gNB 210-1 in support of a prospective PDU/application session. For example, the NSSS logic may obtain this information from a modem of UE 205 or another component or hardware (e.g., memory) of UE 205. The NSSS process may include analyzing other context information and apply such information to criteria or policies. Exemplary network slice selection service information is described herein.

Figure 3:
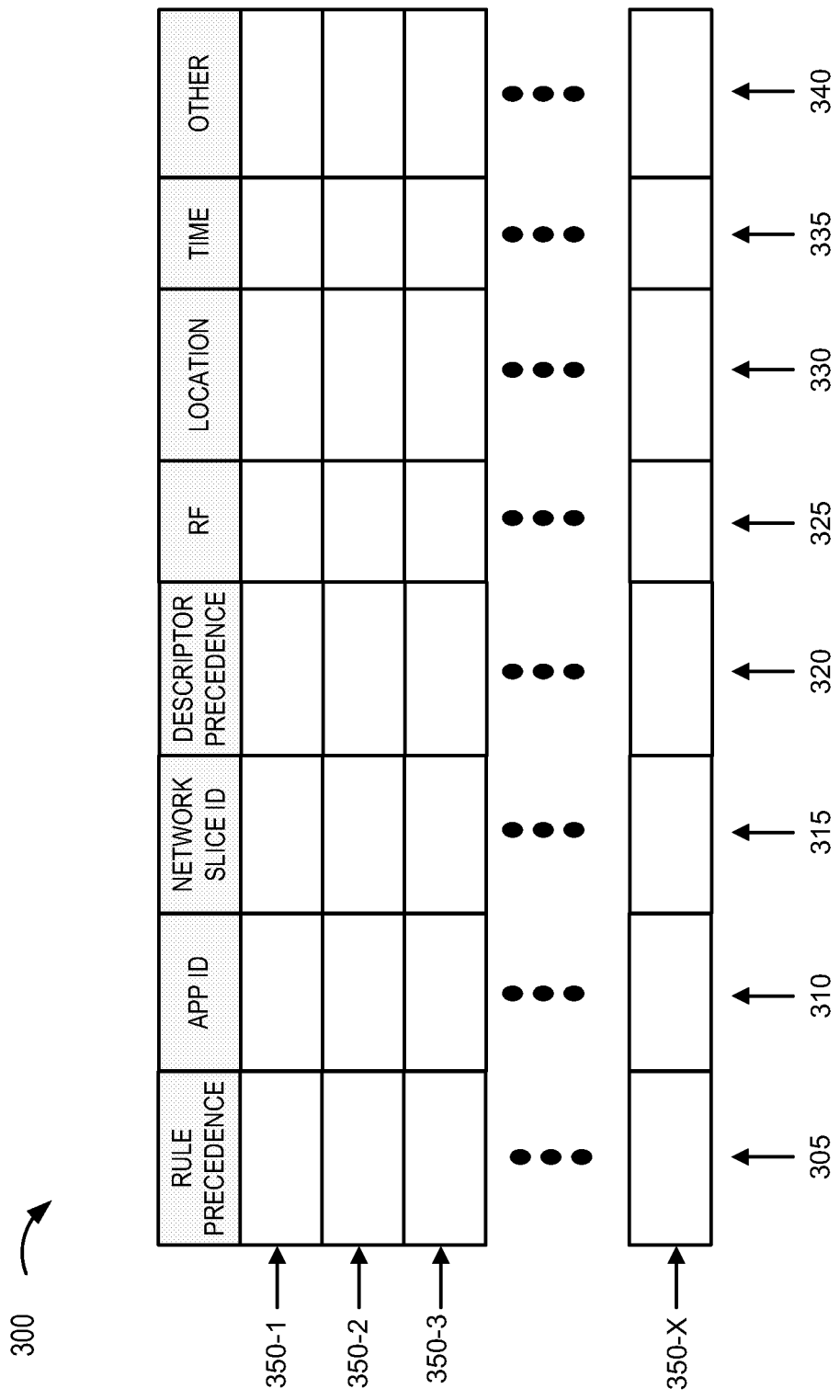
FIG. 3 is a diagram illustrating exemplary network slice selection service information.

FIG. 3 is a diagram illustrating exemplary network slice selection service information 300 that may be stored, for example, by end device 130. As illustrated, a table 300 may include a rule precedence field 305, an application identifier field 310, a network slice identifier field 315, a descriptor precedence field 320, an RF field 325, a location field 330, a time field 335, and one or multiple other fields 340. As further illustrated, table 300 includes records 350-1 through 350-X (also referred to as records 350, or individually or generally as record 350) that each includes a grouping of fields 305 through 340 (e.g., correlated information). Network slice selection service information 300 is illustrated in tabular form merely for the sake of description. In this regard, network slice selection service information 300 may be implemented in a data structure different from a table. The number and/or types of fields illustrated and described are exemplary.

Rule precedence field 305 may store data that indicates a priority or precedence of the rule or policy (e.g., record 350). According to some exemplary implementations, the priority value may be unique relative to the other rules or relative to the other rules of a particular application identified by application identifier field 310. According to other exemplary implementations, the priority value may not be unique relative to the other rules or relative to the other rules of a particular application.

Application identifier field 310 may store data that identifies an application or an application service, as described herein. Network slice identifier field 315 may store data indicating a network slice identifier, an S-NSSAI or an SST value, for example, as described herein.

Descriptor precedence field 320 may store data that indicates a priority or precedence of a criterion and/or a descriptor. According to an exemplary implementation, each criterion/descriptor may be associated with a priority value. According to another exemplary implementation, each criterion/descriptor may not be associated with a priority value. According to some exemplary implementations, a criterion/ descriptor may be optionally satisfied (e.g., in order for the rule or policy to be selected) or may be mandatory to be satisfied. According to this example of network slice selection service information 300, the exemplary criteria/descriptors may include fields 325 through 340.

RF field 325 may store data that indicates an RF. For example, the RF may be a single RF, multiple RFs, a radio band, a radio carrier, or another segment of radio spectrum. According to another example, the RF may indicate a category of radio spectrum, such as mm wave, cm wave, C band, low band, above mm wave, and so forth. According to some exemplary implementations, RF field 325 may include data indicating other characteristics, such as modulation scheme. RF field 325 may also include data pertaining to connectivity (e.g., DC, SA, NSA, etc.).

Location field 330 may store data that indicates a location. For example, the location data may be implemented to include a cell identifier, an access device 107 identifier (e.g., a gNB identifier or the like), a tracking area (TA), a routing area (RA), and/or another type of geographic data that indicates a coverage or location area.

Time field 335 may store data that indicates time information. For example, the time information may include a time-of-day window (e.g., 3 pm-10 pm, 7:30 am-5:30 pm, etc.). The time information may include day of the week information (e.g., Monday-Friday, etc.). The time information may include other time indicators.

Other field 340 may store data that indicates one or multiple other types of descriptors. For example, other field 340 may store data pertaining to or indicating a data network name (DNN), a destination fully qualified domain name (FQDN), a session and service continuity (SSC) mode, a PDU session type (e.g., Ethernet, etc.), a preferred access type (e.g., 3GPP, non-3GPP, or another type of access type), a RAT (e.g., 5G, LTE, Wi-Fi, etc.), connection capability (e.g., MMS, Internet, etc.) and/or another type of known, standardized, or proprietary descriptor (e.g., traffic descriptor, route selection descriptor (RSD).

According to other exemplary implementations, table 300 may store additional, fewer, and/or different instances of network slice selection service information in support of the network slice selection service, as described herein.

Referring back to FIG. 2A, UE 205 may analyze and select a URSP rule 255 based on network slice selection service information 300. According to this exemplary scenario, assume there is not an already existing PDU session to use or re-use. According to an exemplary embodiment, UE 205 may select a portion of policies that pertain to or apply to the application detected based on application identifier field 310. According to an exemplary embodiment, UE 205 may analyze and select one or multiple policies of the portion of polices based on their respective priority value indicated in rule precedence field 305. According to various exemplary embodiments, UE 205 may further analyze one or multiple descriptors (e.g., RF, location, time, etc.), as described herein, and one or multiple descriptor precedence values pertaining to such descriptor(s). According to an exemplary embodiment, UE 205 may analyze the RF, as mentioned above. According to other embodiments, UE 205 may analyze the RF in combination with one or multiple other descriptors. According to some exemplary embodiments, the RF descriptor may have a precedence over every other descriptor. According to other exemplary embodiments, this may not be the case.

Based on the analysis, UE 205 may select a URSP rule (e.g., record 350) and may establish an application or PDU session 260 with application server 220-1 via a network slice 1. For example, although not illustrated, UE 205 may generate and transmit a PDU session establishment request, which may include network slice information (e.g., S-NS-SAI) that is indicated in network slice identifier field 315 of the record 350 corresponding to the selected URSP rule, according to a PDU session establishment procedure of a network standard (e.g., 3GPP, etc.) or according to a proprietary approach. For example, UE 205 may transmit the PDU session establishment request to an AMF of core network 120 (not illustrated) via gNB 210-1. It may be assumed that the request is accepted. While network slice 1, which supports an application session 230, is illustrated as traversing gNB 210-1 and MEC network 215-1, according to other exemplary embodiments, network slice 1 may traverse core network 120 and core devices (not illustrated) and MEC network 215-1.

Figure 2B:
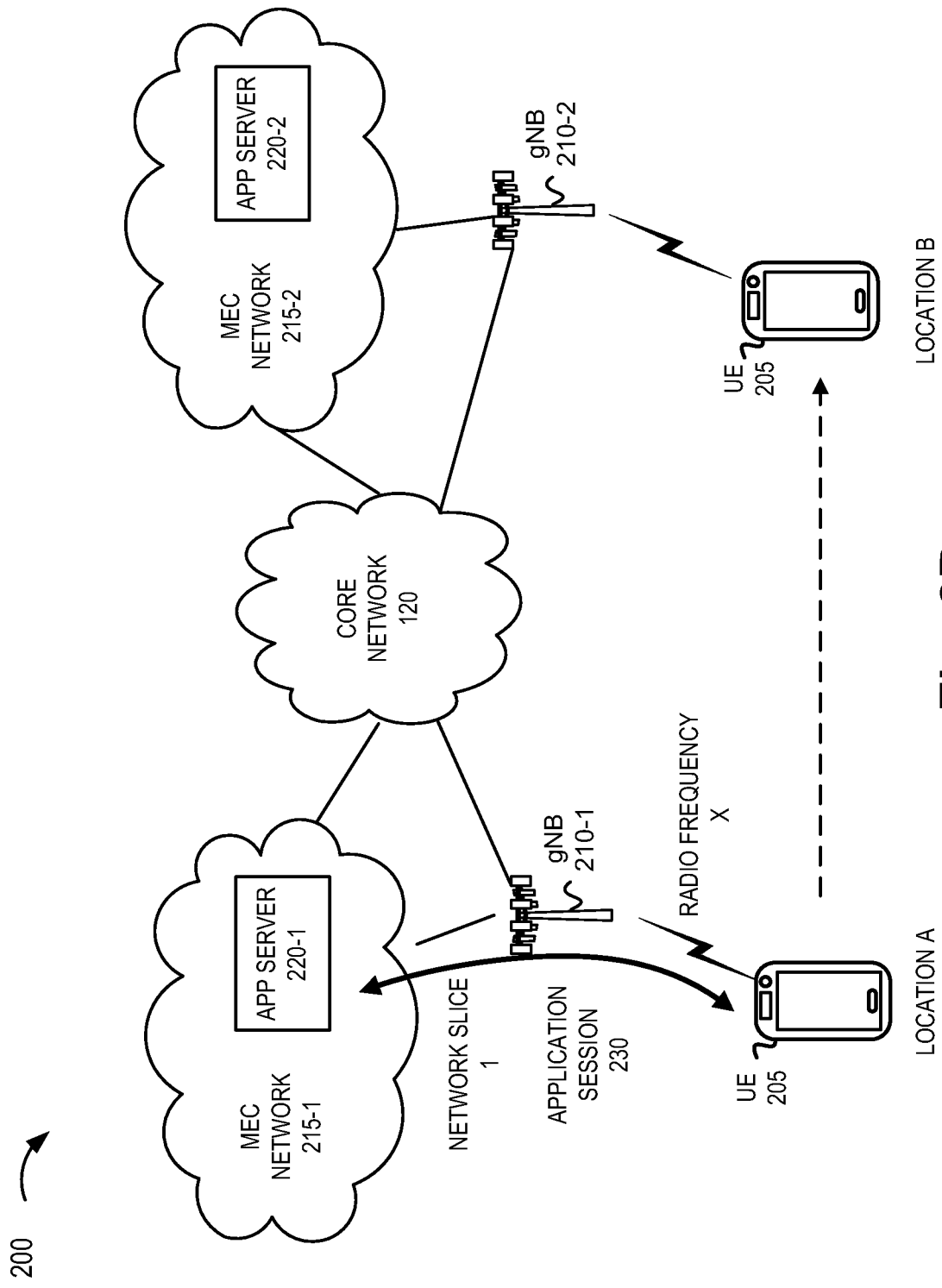
Figure 2C:
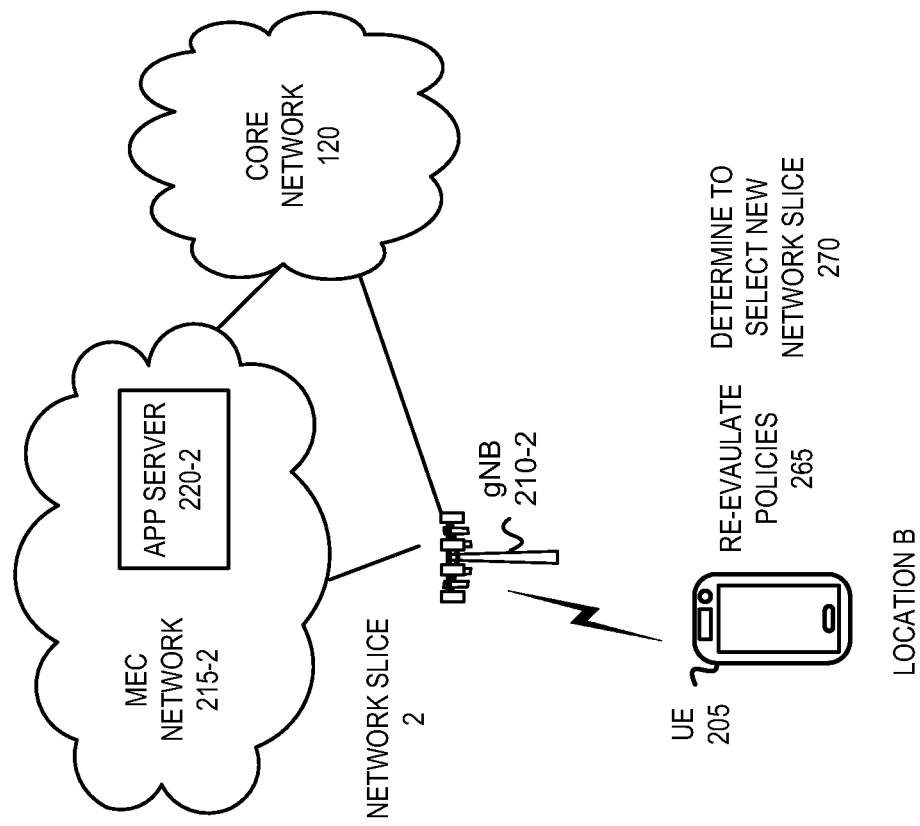

Referring to FIG. 2B, assume that UE 205 moves (e.g., from Location A to Location B) during the PDU session. Referring to FIG. 2C, UE 205 may re-evaluate policies 265 that support the PDU session. According to various exemplary embodiments, UE 205 may re-evaluate policies based on a triggering event. For example, the triggering event may include the initiation or execution of a cell reselection procedure and/or another type of network procedure (e.g., handover, RRC procedure, attachment, cell selection procedure, a routing area update (RAU) procedure, and/or another type of procedure that may include scanning and/or measuring RF and/or determining a location of UE 205). Additionally, or alternatively, the triggering event may include a configuration of the network slice selection service. For example, an embodiment of the network slice selection service may include a configuration that provides UE 205 may periodically re-evaluate criteria and/or network slice usage associated with the network slice selection service and information.

According to this exemplary scenario, assume that the re-evaluation procedure determines that the Radio Frequency X may not be available at Location B or a result of the cell reselection procedure may indicate that the Radio Frequency X may no longer satisfy a threshold value associated with a radio measurement (e.g., signal quality value, channel quality value, etc.) for cell reselection. According to an exemplary embodiment, the re-evaluation procedure may include selecting a new network slice (e.g., different from network slice 1) 270 based on the available RF at Location B and network slice selection service information 300. For example, UE 205 may select a Radio Frequency Y (e.g., a K-band or another RF that is different from Radio Frequency X).

Figure 2D:
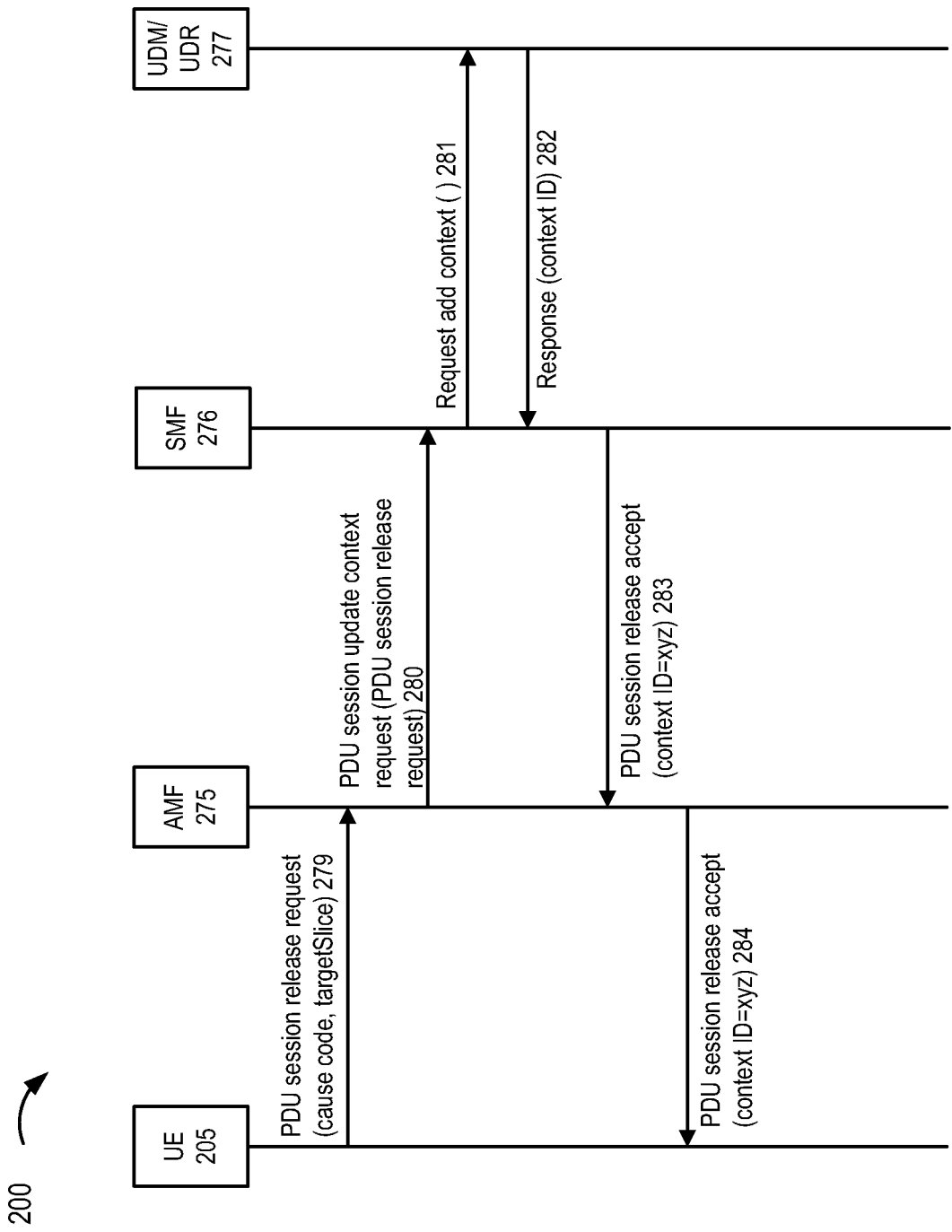

Referring to FIG. 2D, according to an exemplary embodiment of the network slice selection service may include invoking a PDU session release procedure. For example, based on the re-evaluation procedure, UE 205 may initiate the PDU session release procedure. As illustrated, UE 205 may generate a PDU session release request 279 and transmit request 279 to an AMF 275. Request 279 may include cause data among other types of data (e.g., PDU session ID, location information, etc.). For example, the cause data may indicate that a (current) network slice is to be changed. Request 279 may also include a new or target network slice identifier. For example, the target network slice identifier may identify a target network slice determined by UE 205 based on the network slice selection service information 300 and RF data, as previously described. As further illustrated, in response to receiving request 279, AMF 275 may generate and transmit a PDU session update context request 280, which may include request 279. In response to receiving request 280, an SMF 276 may invoke a PDU session release procedure. For example, the release procedure may include SMF 276 generating and transmitting a request 281 to an UDM/UDR 277 and receiving a response 282. Request 281 may request a context identifier pertaining to context information associated with the PDU session to be released and response 282 may include the context identifier. For example, the context identifier may be an identifier of context information stored by the network for the PDU session. As further illustrated, SMF 276 and AMF 275 may generate and transmit PDU session release accepts 283 and 284, respectively, which may include the context identifier that may identify network-side context information pertaining to the PDU session, to UE 205.

Figure 2E:
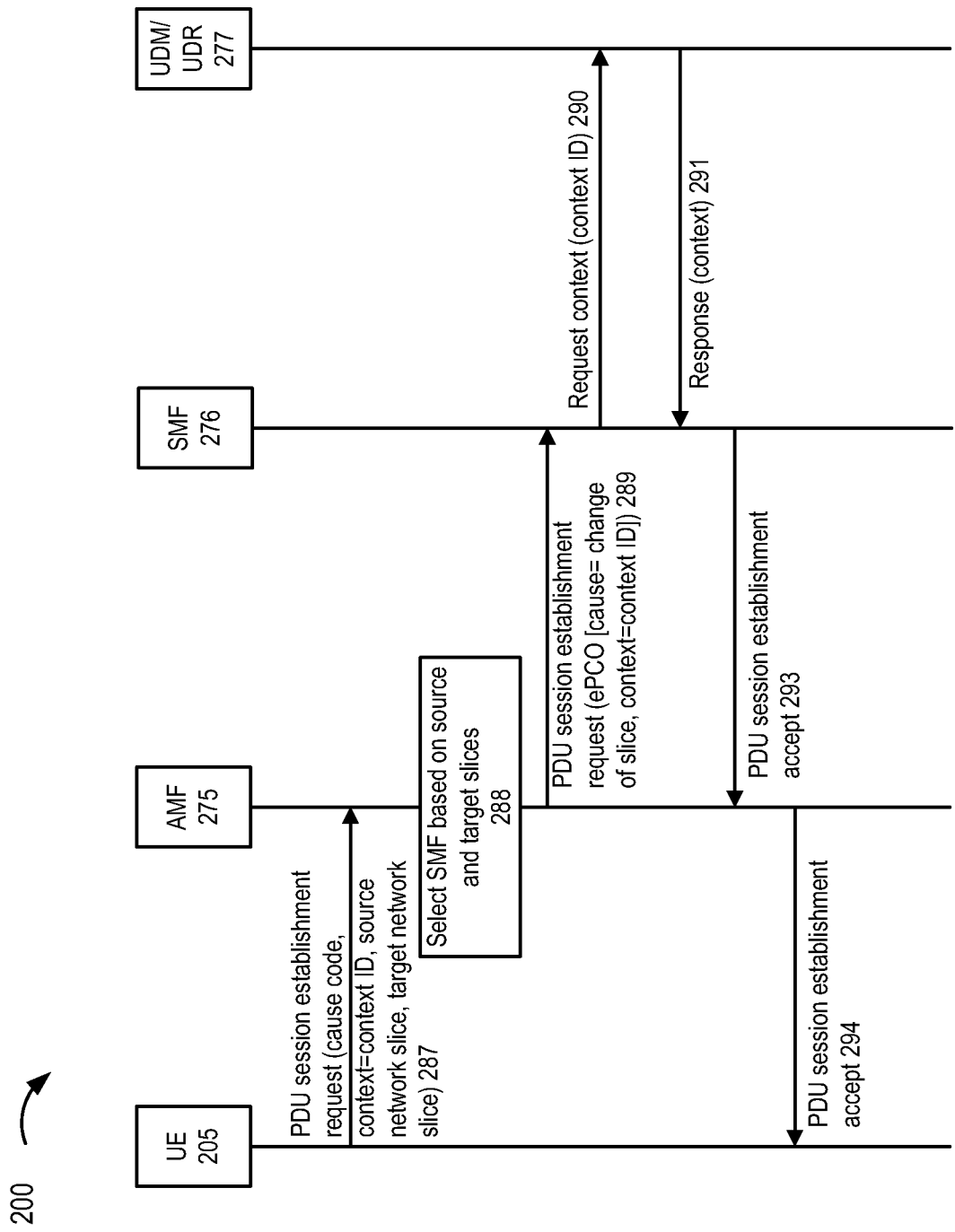

Referring to FIG. 2E, according to an exemplary embodiment of the network slice selection service session may include invoking a PDU session establishment procedure. For example, based on the re-evaluation procedure, UE 205 may initiate the PDU session establishment procedure. For example, as illustrated, UE 205 may generate a PDU session establishment request 287 and transmit request 287 to AMF 275 (or another/new AMF). Request 287 may include cause data, a context identifier (e.g., associated with the PDU session release procedure), and source and target network slice identifiers. In response to receiving request 287, AMF 275 may select an SMF based on the source and target network slice identifiers and/or other information 288 (e.g., cause data, context identifier, etc.). According to this exemplary scenario, assume AMF 275 determines that the same SMF 276 may be used to support the target network slice. According to another exemplary scenario, AMF 275 may select a different SMF from SMF 276. As illustrated, AMF 275 may generate and transmit a PDU session establishment request 289, which may include the cause data and/or the context identifier, to SMF 276.

Figure 2F:
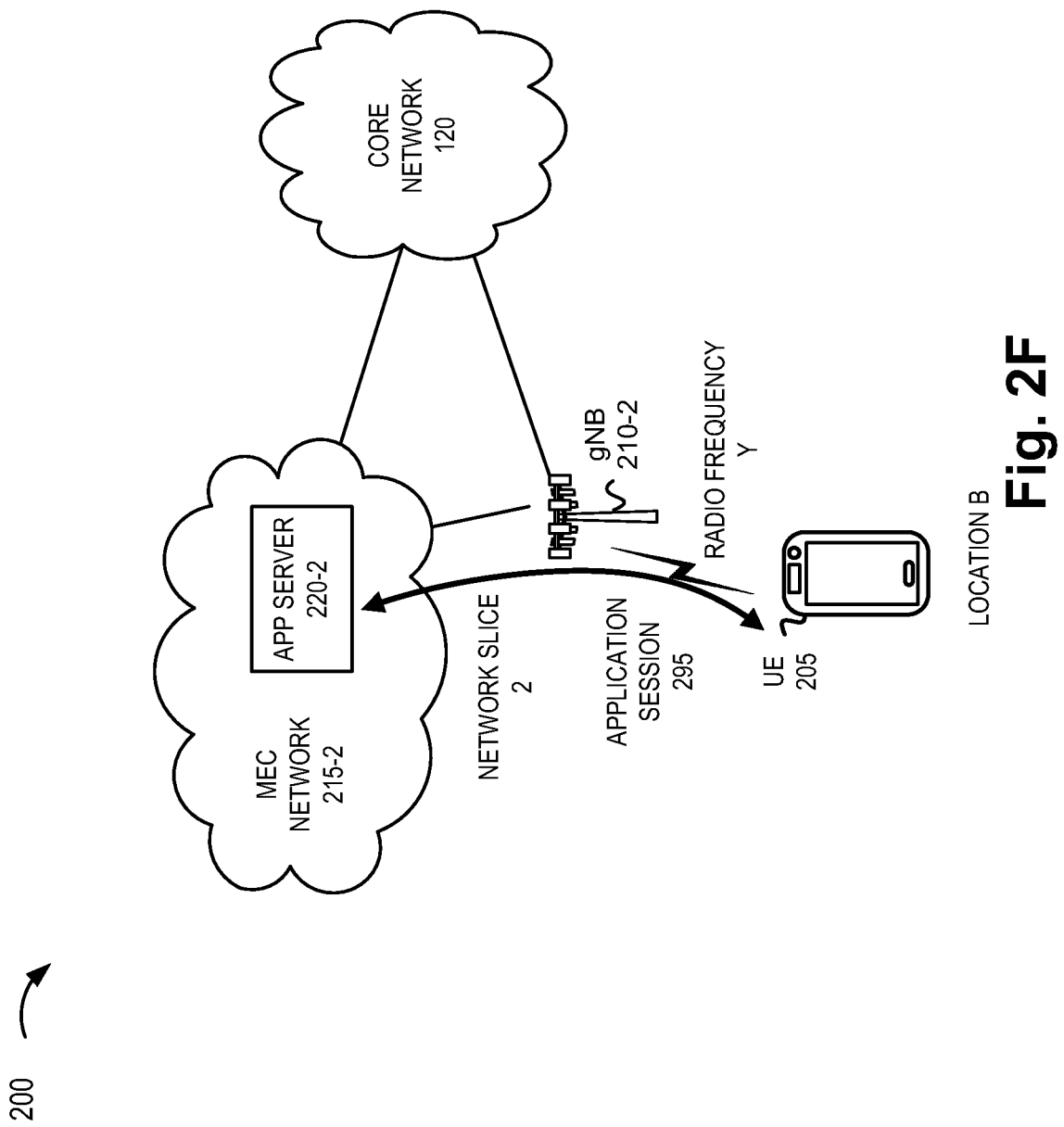

In response to receiving request 289, SMF 276 (or a different SMF) may generate and transmit a context request 290, which may include the context identifier, to UDM/UDR 277 and may receive a response 291, which includes the context associated with the context identifier. As further illustrated, SMF 276 (or the different SMF) and AMF 275 may generate and transmit PDU session establishment accepts 293 and 294, respectively, to UE 205. Referring to FIG. 2F, UE 205 may establish an application session a 295 with application server 220-2 of MEC network 215-2 via a Network Slice 2 and a Radio Frequency Y. While Network Slice 2, which supports application session 295, is illustrated as traversing gNB 210-2 and MEC network 215-2, according to other exemplary embodiments, network slice 2 may traverse core network 120 and core devices (not illustrated) to MEC network 215-2.

The type of messages and the content of the messages illustrated and described in relation to FIGS. 2A-2F are exemplary. According to other exemplary embodiments, additional and/or different messages may be transmitted and/or received to implement process 200 and the network slice selection service, as described herein. Some messages may have been omitted for the sake of brevity.

FIGS. 2A-2F illustrate and describe an exemplary process of an exemplary embodiment of the network slice selection service, however according to other exemplary embodiments, the network slice selection service may include additional, different and/or fewer operations relative to those described. According to an exemplary embodiment, with reference to process 200, if permitted, the network slice selection service may include selecting the same UPF (and/ or other core devices 122 and/or external devices 117) used by UE 205 for network slice 1 to now support network slice 2.

Figure 4:
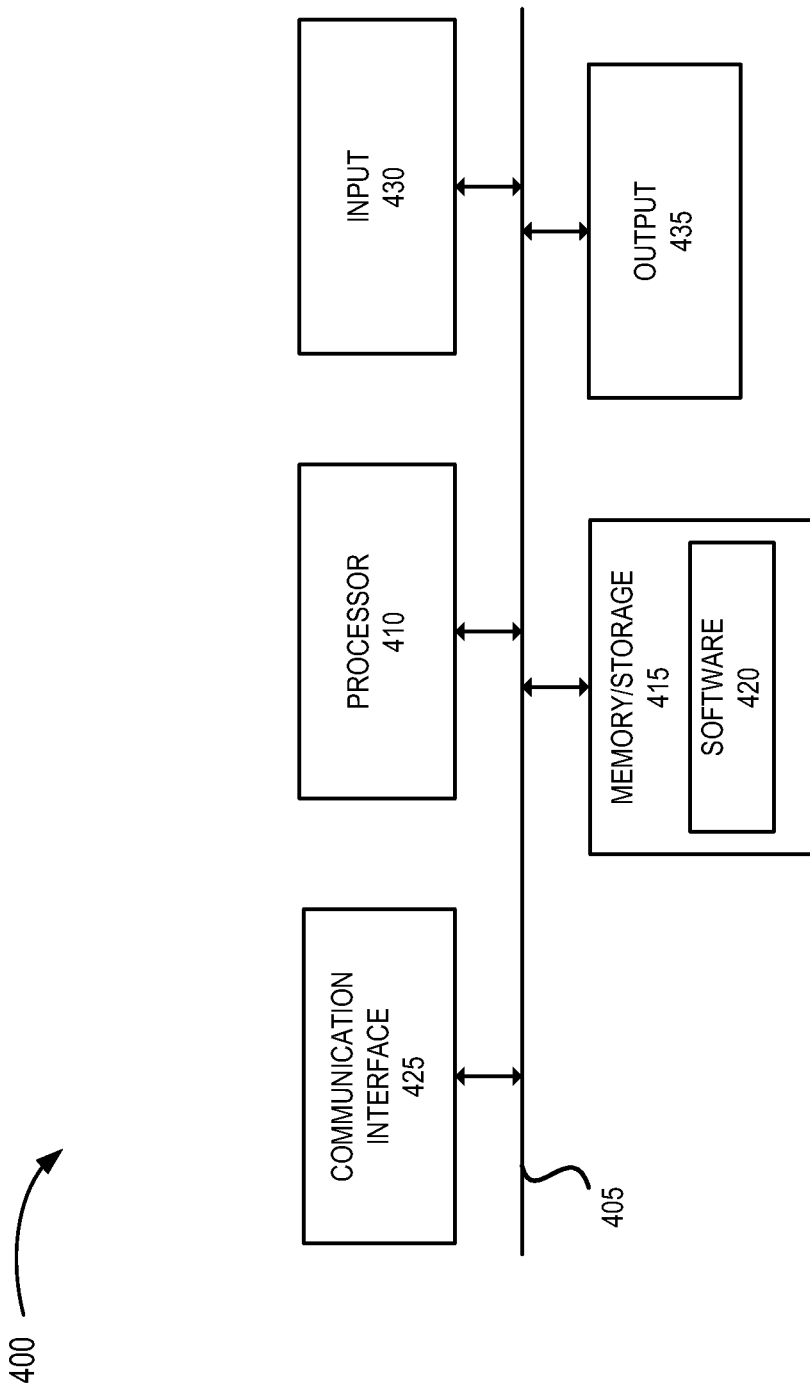
FIG. 4 is a diagram illustrating exemplary components of a device that may correspond to one or more of the devices illustrated and described herein.

FIG. 4 is a diagram illustrating exemplary components of a device 400 that may be included in one or more of the devices described herein. For example, device 400 may correspond to access device 107, external device 117, core device 122, end device 130, and/or other types of devices, as described herein. As illustrated in FIG. 4, device 400 includes a bus 405, a processor 410, a memory/storage 415 that stores software 420, a communication interface 425, an input 430, and an output 435. According to other embodiments, device 400 may include fewer components, additional components, different components, and/or a different arrangement of components than those illustrated in FIG. 4 and described herein.

Bus 405 includes a path that permits communication among the components of device 400. For example, bus 405 may include a system bus, an address bus, a data bus, and/or a control bus. Bus 405 may also include bus drivers, bus arbiters, bus interfaces, clocks, and so forth.

Processor 410 includes one or multiple processors, microprocessors, data processors, co-processors, graphics processing units (GPUs), application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, neural processing unit (NPUs), and/or some other type of component that interprets and/or executes instructions and/or data. Processor 410 may be implemented as hardware (e.g., a microprocessor, etc.), a combination of hardware and software (e.g., a SoC, an ASIC, etc.), may include one or multiple memories (e.g., cache, etc.), etc.

Processor 410 may control the overall operation, or a portion of operation(s) performed by device 400. Processor 410 may perform one or multiple operations based on an operating system and/or various applications or computer programs (e.g., software 420). Processor 410 may access instructions from memory/storage 415, from other components of device 400, and/or from a source external to device 400 (e.g., a network, another device, etc.). Processor 410 may perform an operation and/or a process based on various techniques including, for example, multithreading, parallel processing, pipelining, interleaving, learning, model-based, etc.

Memory/storage 415 includes one or multiple memories and/or one or multiple other types of storage mediums. For example, memory/storage 415 may include one or multiple types of memories, such as, a random access memory (RAM), a dynamic RAM (DRAM), a static RAM (SRAM), a cache, a read only memory (ROM), a programmable ROM (PROM), an erasable PROM (EPROM), an electrically EPROM (EEPROM), a single in-line memory module (SIMM), a dual in-line memory module (DIMM), a flash memory (e.g., 2D, 3D, NOR, NAND, etc.), a solid state memory, and/or some other type of memory. Memory/storage 415 may include a hard disk (e.g., a magnetic disk, an optical disk, a magneto-optic disk, a solid-state component, etc.), a Micro-Electromechanical System (MEMS)-based storage medium, and/or a nanotechnology-based storage medium.

Memory/storage 415 may be external to and/or removable from device 400, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray disk (BD), etc.). Memory/storage 415 may store data, software, and/or instructions related to the operation of device 400.

Software 420 includes an application or a program that provides a function and/or a process. As an example, with reference to end device 130, software 420 may include an application that, when executed by processor 410, provides a function and/or a process of network slice selection service, as described herein. Additionally, with reference to access device 107 and/or core device 122, software 420 may include an application that, when executed by processor 410, provides a function and/or a process of network slice selection service, as described herein. Software 420 may also include firmware, middleware, microcode, hardware description language (HDL), and/or other form of instruction. Software 420 may also be virtualized. Software 420 may further include an operating system (OS) (e.g., Windows, Linux, Android, proprietary, etc.).

Communication interface 425 permits device 400 to communicate with other devices, networks, systems, and/or the like. Communication interface 425 includes one or multiple wireless interfaces and/or wired interfaces. For example, communication interface 425 may include one or multiple transmitters and receivers, or transceivers. Communication interface 425 may operate according to a protocol stack and a communication standard.

Input 430 permits an input into device 400. For example, input 430 may include a keyboard, a mouse, a display, a touchscreen, a touchless screen, a button, a switch, an input port, a joystick, speech recognition logic, and/or some other type of visual, auditory, tactile, affective, olfactory, etc., input component. Output 435 permits an output from device 400. For example, output 435 may include a speaker, a display, a touchscreen, a touchless screen, a light, an output port, and/or some other type of visual, auditory, tactile, etc., output component.

As previously described, a network device may be implemented according to various computing architectures (e.g., in a cloud, etc.) and according to various network architectures (e.g., a virtualized function, PaaS, etc.). Device 400 may be implemented in the same manner. For example, device 400 may be instantiated, created, deleted, or some other operational state during its life-cycle (e.g., refreshed, paused, suspended, rebooting, or another type of state or status), using well-known virtualization technologies. For example, access device 107, core device 122, external device 117, and/or another type of network device or end device 130, as described herein, may be a virtualized device.

Device 400 may perform a process and/or a function, as described herein, in response to processor 410 executing software 420 stored by memory/storage 415. By way of example, instructions may be read into memory/storage 415 from another memory/storage 415 (not shown) or read from another device (not shown) via communication interface 425. The instructions stored by memory/storage 415 cause processor 410 to perform a function or a process described herein. Alternatively, for example, according to other implementations, device 400 performs a function or a process described herein based on the execution of hardware (processor 410, etc.).

Figure 5:
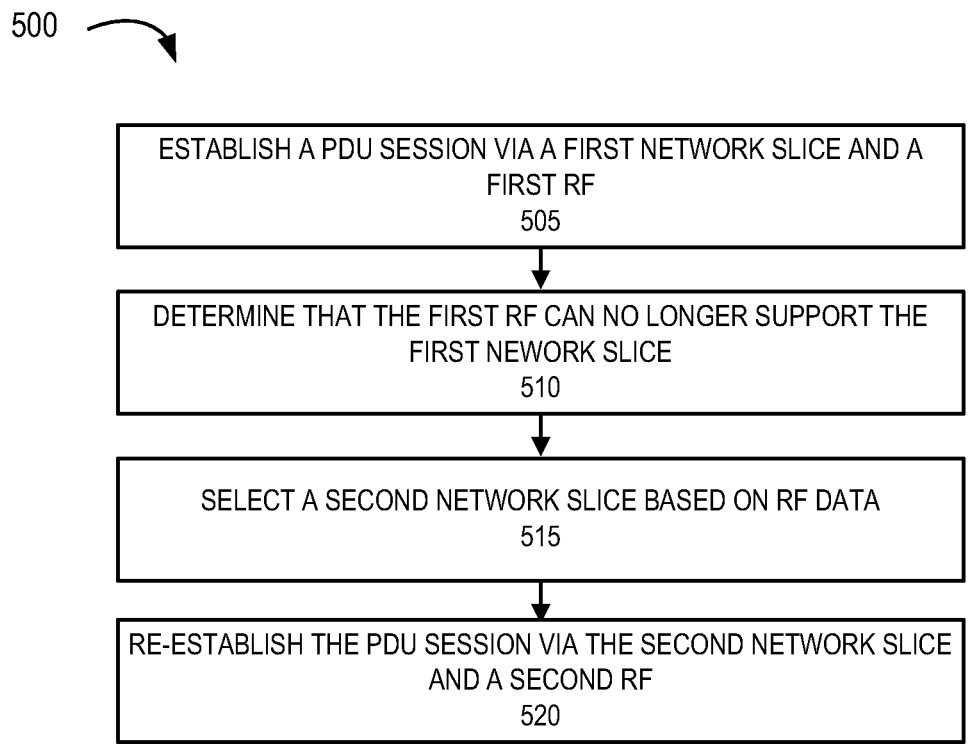
FIG. 5 is a flow diagram illustrating yet another exemplary process of an exemplary embodiment of the network slice selection service.

FIG. 5 is a flow diagram illustrating an exemplary process 500 of an exemplary embodiment of the network slice selection service. According to an exemplary embodiment, end device 130 may perform a step of process 500. According to an exemplary implementation, processor 410 executes software 420 to perform the step of process 500, as described herein. Alternatively, the step may be performed by execution of only hardware.

In block 505, end device 130 may establish a PDU session via a first network slice and a first RF. For example, end device 130 may include using RF data to select a URSP rule to establish the PDU session via a network slice for an application, as described herein.

In block 510, end device 130 may determine that the first RF can no longer support the first network slice. For example, during the PDU session (and potentially due to mobility), end device 130 may make this determination, as described herein.

In block 515, end device 130 may select a second network slice based on RF data. For example, end device 130 may include using current RF data to select a URSP rule and the second network slice for maintaining the PDU session.

In block 520, end device 130 may re-establish the PDU session via the second network slice and a second RF. For example, end device 130 may perform a PDU session release procedure pertaining to the PDU session and establish a PDU session for the same application via the second network slice and a second RF, which may be different than the RF used to establish the PDU session in block 505, as described herein.

FIG. 5 illustrates an exemplary embodiment of a process of the network slice selection service, according to other exemplary embodiments, the network slice selection service may perform additional operations, fewer operations, and/or different operations than those illustrated and described.

Figure 6:
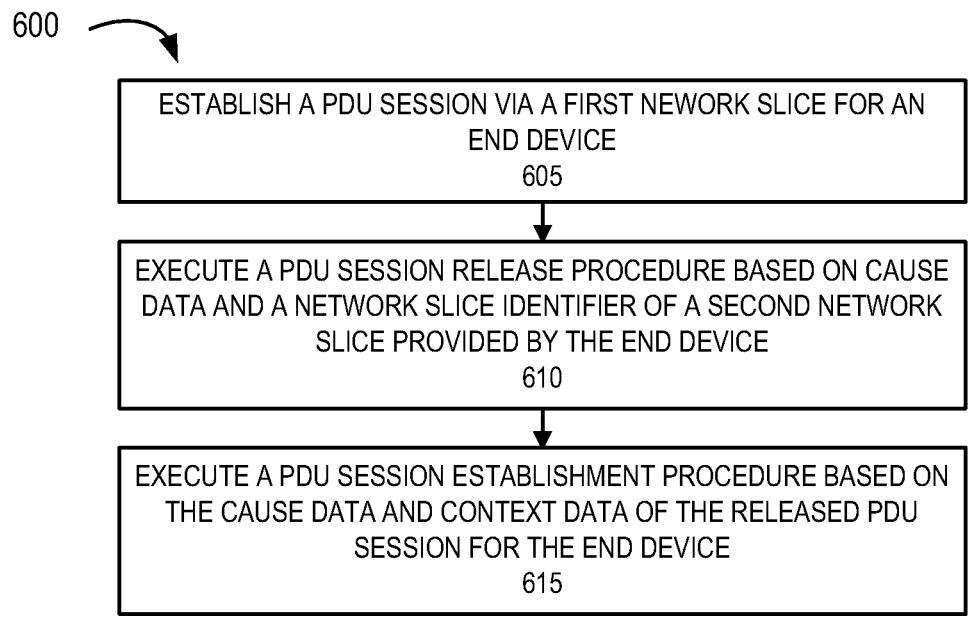
FIG. 6 is a flow diagram illustrating still another exemplary process of an exemplary embodiment of the network slice selection service.

FIG. 6 is a flow diagram illustrating an exemplary process 600 of an exemplary embodiment of the network slice selection service. According to an exemplary embodiment, core network 120 may perform process 600. According to an exemplary implementation, processor 410 executes software 420 to perform the step of process 600, as described herein. Alternatively, the step may be performed by execution of only hardware.

In block 605, core network 120 may establish a PDU session via a first network slice for an end device 130. For example, core network 120 may receive a PDU session establishment request, which includes a network slice identifier, from end device 130, as described herein.

In block 610, core network 120 may execute a PDU session release procedure based on cause data and a network slice identifier of a second network slice provided by end device 130. For example, core network 120 may receive a PDU session release request, which may include the cause data and/or the network slice identifier, from end device 130. Core network 120 may release the PDU session and provide context data pertaining to the PDU session to end device 130, as described herein.

In block 615, core network 120 may execute a PDU session establishment procedure based on the cause data and the context data of the released PDU session for end device 130. For example, core network 120 may use cause and context data included in a PDU session establishment request from end device 130 to establish a new PDU session via a second RF and the second network slice, as described herein.

FIG. 6 illustrates an exemplary embodiment of a process of the network slice selection service, according to other exemplary embodiments, the network slice selection service may perform additional operations, fewer operations, and/or different operations than those illustrated and described.

As set forth in this description and illustrated by the drawings, reference is made to "an exemplary embodiment," "exemplary embodiments," "an embodiment," "embodiments," etc., which may include a particular feature, structure, or characteristic in connection with an embodiment(s). However, the use of the phrase or term "an embodiment," "embodiments," etc., in various places in the description does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while series of blocks have been described regarding the processes illustrated in FIGS. 5 and 6, the order of the blocks may be modified according to other embodiments. Further, non-dependent blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 410, etc.), or a combination of hardware and software (e.g., software 420).

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 410) of a device. A non-transitory storage medium includes one or more of the storage mediums described in relation to memory/storage 415. The non-transitory computer-readable storage medium may be implemented in a centralized, distributed, or logical division that may include a single physical memory device or multiple physical memory devices spread across one or multiple network devices.

To the extent the aforementioned embodiments collect, store, or employ personal information of individuals, it should be understood that such information shall be collected, stored, and used in accordance with all applicable laws concerning protection of personal information. Additionally, the collection, storage and use of such information can be subject to consent of the individual to such activity, for example, through well known "opt-in" or "opt-out" processes as can be appropriate for the situation and type of information. Collection, storage and use of personal information can be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such.

All structural and functional equivalents to the elements of the various aspects set forth in this disclosure that are known or later come to be known are expressly incorporated herein by reference and are intended to be encompassed by the claims.

What is claimed is:

1. A method comprising:
    establishing, by an end device, a first protocol data unit (PDU) session via a first network slice and a first radio frequency;
    determining, by the end device, that the first radio frequency cannot support the first PDU session;
    selecting, by the end device, a second radio frequency and a second network slice based on route selection policies that include radio frequency criteria;
    transmitting, by the end device, a PDU session release request that includes an identifier of the second network slice and cause information indicating to change a current network slice to the second network slice; and
    re-establishing, by the end device, the first PDU session via the second network slice and the second radio frequency.

2. The method of claim 1, wherein the radio frequency criteria indicate a connectivity type including one of a standalone, a non-standalone, or a dual connectivity.

3. The method of claim 1, wherein the re-establishing comprises:
    receiving, by the end device from a core network device of a core network, context data pertaining to the first PDU session.

4. The method of claim 3, wherein the re-establishing comprises:
    transmitting, by the end device to the core network device of the core network, a PDU session establishment request that includes cause data indicating to change a current network slice, the context data, and an identifier of the second network slice.

5. The method of claim 1, wherein the determining is triggered by a cell reselection procedure.

6. The method of claim 1, wherein the selecting comprises:
    selecting, by the end device, the second radio frequency and the second network slice based on the route selection policies that include one or more of location, time, or radio access technology (RAT) criteria.

7. The method of claim 1, wherein the radio frequency criteria include a radio frequency or a radio frequency band.

8. The method of claim 1, further comprising:
    storing, by the end device, the route selection policies that include correlations between applications, network slices, and the radio frequency criteria.

9. A device comprising:
    a processor configured to:
        establish a first protocol data unit (PDU) session via a first network slice and a first radio frequency;
        determine that the first radio frequency cannot support the first PDU session;
        select a second radio frequency and a second network slice based on route selection policies that include radio frequency criteria;
        transmit a PDU session release request that includes an identifier of the second network slice and cause information indicating to change a current network slice to the second network slice; and
        re-establish the first PDU session via the second network slice and the second radio frequency.

10. The device of claim 9, wherein the radio frequency criteria indicate a connectivity type including one of a standalone, a non-standalone, or a dual connectivity.

11. The device of claim 9, wherein, when re-establishing, the processor is configured to:
    receive from a core network device of a core network, context data pertaining to the first PDU session.

12. The device of claim 11, wherein, when re-establishing, the processor is configured to:
    transmit to the core network device of the core network, a PDU session establishment request that includes cause data indicating to change a current network slice, the context data, and an identifier of the second network slice.

13. The device of claim 9, wherein the processor is configured to:
    detect a cell reselection procedure, and wherein, when determining, the processor is configured to:
    determine that the first radio frequency cannot support the PDU session based on the cell reselection procedure.

14. The device of claim 9, wherein, when selecting, the processor is configured to:
    select the second radio frequency and the second network slice based on the route selection policies that include one or more of location, time, or radio access technology (RAT) criteria.

15. The device of claim 9, wherein the radio frequency criteria include a radio frequency or a radio frequency band.

16. The device of claim 9, wherein the processor is configured to:
    store the route selection policies that include correlations between applications, network slices, and the radio frequency criteria.

17. A non-transitory computer-readable storage medium storing instructions executable by a processor of a device, wherein the instructions are configured to:
    establish a first protocol data unit (PDU) session via a first network slice and a first radio frequency;
    determine that the first radio frequency cannot support the first PDU session;

select a second radio frequency and a second network slice based on route selection policies that include radio frequency criteria;

transmit a PDU session release request that includes an identifier of the second network slice and cause information indicating to change a current network slice to the second network slice; and re-establish the first PDU session via the second network slice and the second radio frequency.

18. The non-transitory computer-readable storage medium of claim 17, wherein the radio frequency criteria indicate a connectivity type including one of a standalone, a non-standalone, or a dual connectivity.

19. The non-transitory computer-readable storage medium of claim 17, wherein the instructions to re-establish comprise further instructions configured to:

receive from a core network device of a core network, context data pertaining to the first PDU session.

20. The non-transitory computer-readable storage medium of claim 17, wherein the radio frequency criteria include a radio frequency or a radio frequency band.

* * * * *